W. F. DRAVIS.
FENDER FOR CORN CULTIVATORS.
APPLICATION FILED NOV. 22, 1919.
1,405,980.
Patented Feb. 7, 1922.
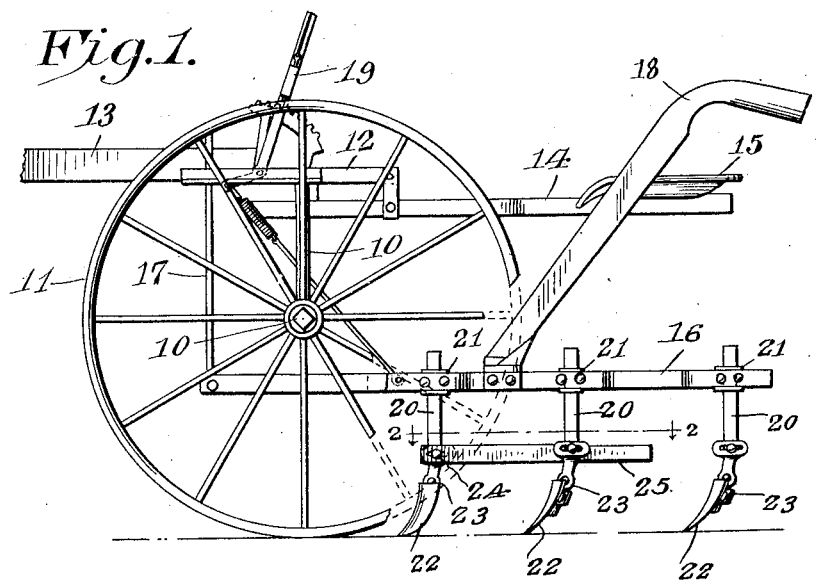
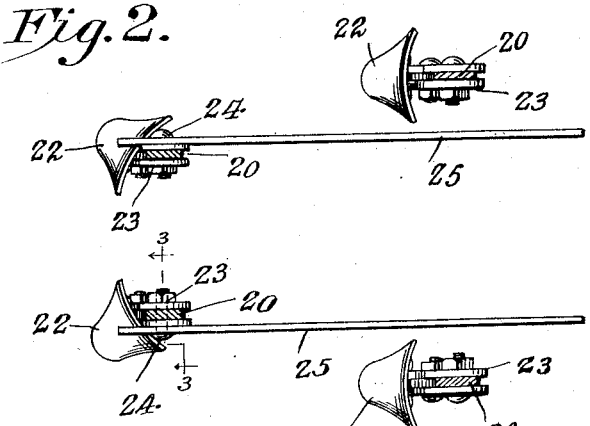
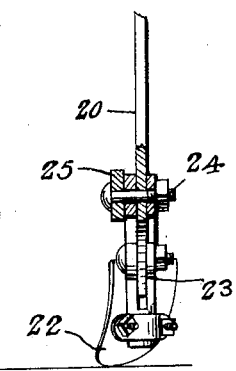
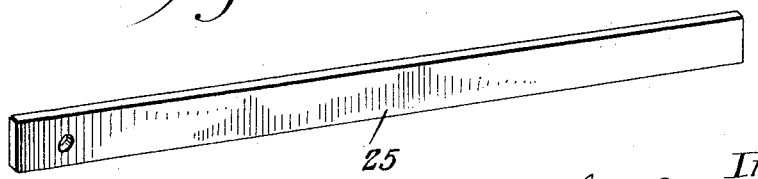
Inventor.
Wm F. Dravis

UNITED STATES PATENT OFFICE.

WILLIAM F. DRAVIS, OF WAUKON, IOWA.

FENDER FOR CORN CULTIVATORS.

1,405,980.  Specification of Letters Patent.  Patented Feb. 7, 1922.

Application filed November 22, 1919. Serial No. 340,070.

*To all whom it may concern:*

Be it known that I, WILLIAM F. DRAVIS, a citizen of the United States, residing at Waukon, in the county of Allamakee and State of Iowa, have invented a new and useful Improvement in Fenders for Corn Cultivators, of which the following is a specification.

This invention relates to cultivators, of either the riding or walking type, more particularly to devices of this character adapted for use in cultivating corn, and has for one of its objects to provide means whereby the inside shovels may be set with an outward slant to cut the weeds and earth close to the corn rows and carry them away from the plants and dispensing with objectionable fender attachments.

Another object of the invention is to provide means whereby all of the shovels may be adjusted to control their angle of operation or "slant," and thus adapt the cultivator to the condition of soil, or to the growth of the plants.

With these and other objects in view, the invention consists in certain novel features of construction as hereinafter shown and described and then specifically pointed out in the claims, and in the drawings illustrative of the preferred embodiment of the invention.

Figure 1 is a side elevation.

Figure 2 is a plan view with the shovel standards in section on the line 2—2 of Figure 1.

Figure 3 is an enlarged detail with parts in section on the line 3—3 of Figure 2.

Figure 4 is an enlarged perspective view of one of the fender slats.

The improved device may be adapted without material structural change to various types of cultivators, either walking or riding, and it is not desired to limit the invention in any manner in this respect, but for the purpose of illustration is shown applied to a conventional combination cultivator including the arched axle 10, carrier wheels 11, frame 12 and tongue 13.

The seat supporting bars are shown at 14 and carrying the seat 15, the cultivator beams are represented at 16 and are supported at their forward ends by brackets 17 depending from the frame 12. The usual handles 18 are connected to the beams 16, and the latter are arranged to be adjusted vertically by the lifting appliances represented conventionally at 19.

The shovel standards are represented at 20 and are coupled in the usual manner at 21 to the beams. The shovels are represented at 22 and are coupled to the standards by clip devices 23 which permit both laterally swinging adjustment and vertically swinging adjustment, so that any required "slant" or "dip" may be imparted to the shovels relatively to the standards.

Bolted or otherwise attached at 24 to the standards 20 of the "inside" shovels are slats or bars 25 which extend rearwardly between the outside standards and in parallel relation to the line of travel of the cultivator, and are retained normally above the surface of the ground, as shown.

These bars or slats are designed to prevent the newly upturned portions of more or less packed and lumpy earth thrown over by the inner or middle shovels from being cast upon the corn plants, especially during the first cultivating when the plants are small. The vertical strain on the slats 25 is relatively slight, so that a single bolt 24 is sufficient to hold each slat in position, and at the same time allow them to be manually adjusted vertically when required.

With some forms of standards one of the bolts by which the shovel adjustments are connected to the standards may be employed for securing the slats.

If too great a quantity of earth and weeds are thrown up during the cultivating and liable to "flood" the slats the latter can be easily elevated at the rear ends to a sufficient extent to "clear."

If the quantity of earth and weeds thrown up are less than normal, then the slats can be lowered at their rear ends to meet this condition.

The slats can thus be readily and quickly adapted to the conditions of the soil, as will be obvious.

The slats 25, it will be noted, are attached to the outer faces of the inside standards, hence clogging is not possible and uprooting caused thereby is prevented.

What is claimed is:

An implement of the class described comprising inner shovel devices in spaced relation, outer shovel devices spaced from the inner shovel devices, fender members extending in alinement rearwardly of the inner shovel devices and spaced from the outer shovel devices, said fenders operating to prevent the material displaced by the outer shovel devices from being thrown into the tracks of the inner shovel devices.

In witness whereof I have hereunto set my hand this 24th day of June, 1919, at Waukon, Iowa.

WM. F. DRAVIS.